United States Patent Office 3,023,213
Patented Feb. 27, 1962

3,023,213
ESTERS AND AMIDES OF 3'-HYDROXYQUIN-OPHTHALONE-5-CARBOXYLIC ACID AND DERIVATIVES THEREOF
John William Richter, Wilmington, Del., assignor to E. I. du Pont de Nemours and Company, Wilmington, Del., a corporation of Delaware
No Drawing. Filed June 30, 1960, Ser. No. 39,755
4 Claims. (Cl. 260—287)

This invention deals with novel organic compounds which are useful as disperse dyes for various fibers such as nylon, polyester, cellulose acetate and cellulose triacetate fiber. More particularly, this invention deals with ester and amide derivatives of 3'-hydroxyquinophthalone-5-carboxylic acids which have the general formula

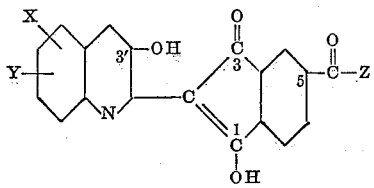

(I)

wherein X represents a member of the group consisting of H, Cl, Br, $CH_3$, and $C_6H_5$ (phenyl); Y represents H, Cl, Br or $CH_3$; and X and Y jointly may represent the benzo configuration

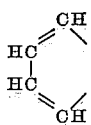

Z is an ether radical of the group consisting of O—$C_nH_{2n+1}$, n being an integer from 1 to 8,

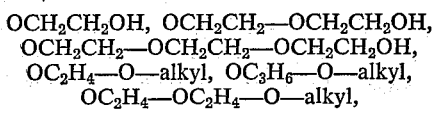

and O—aryl of 6 to 10 C-atoms in the cyclic structure, or an amine radical of the form

wherein A is a member of the group consisting of H, $C_nH_{2n+1}$, n being an integer from 1 to 8, hydroxylalkyl, phenyl and benzyl while B is a member of the group consisting of hydrogen, alkyl and hydroxyalkyl, all the alkyl radicals hereinabove mentioned being alkyl radicals of 1 to 4 C-atoms.

The novel carboxylic acids employed as starting materials in this invention are prepared, by reacting trimellitic acid or its anhydride, in an inert organic solvent such as trichlorobenzene or o-dichlorobenzene and at a temperature of 165° to 200° C., with a 3-hydroxy-2-methyl-quinoline-4-carboxylic acid of the formula

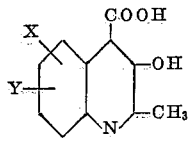

wherein X and Y have the same significance as above, and recovering the reaction product. The 4-COOH group of the initial quinoline compound is eliminated during the reaction.

Treatment of the 3'-hydroxyquinophthalone-5-carboxylic acid compound with thionyl chloride or bromide, in per se known fashion, converts the acid into the corresponding carbonyl halide. These carbonyl halides serve as intermediates for the preparation of the desired esters and amides, by reaction with correspondingly selected alcohols or amines.

Without limiting this invention, the following examples are given to illustrate my preferred mode of operation. Parts mentioned are by weight.

PART I.—PREPARATION OF THE INTERMEDIATE CARBOXYLIC ACIDS AND THEIR HALIDES

Example 1

A mixture of 22 parts of 3-hydroxyl-2-methyl-4-quinolinecarboxylic acid, 29 parts of trimellitic acid, and 90 parts of trichlorobenzene is agitated and heated in the range of 180° to 200° C. for 1.5 to 2 hours. The mixture is stirred with 400 parts of 2 N sodium hydroxide, treated with an activated carbon and a diatomaceous earth filter aid, and clarified. The water layer is drawn off and acidified with 100 parts of 8 N acetic acid. The yellow-brown precipitate is collected on a filter, washed with water and dried. The 3'-hydroxyquinophthalone-5-carboxylic acid thus obtained melts at 385° to 390° C. and is represented by the following formula:

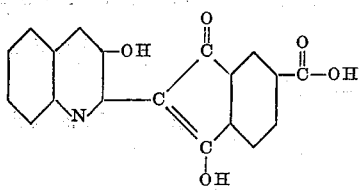

The product may be purified by dissolving it in 2,000 parts of 1.0 M aqueous sodium carbonate at the boil and filtering hot. To the warm filtrate is added 700 parts of a 20% sodium chloride solution. After cooling to room temperature, the yellow sodium salt of 3'-hydroxyquinophthalone-5-carboxylic acid is collected on a filter and dried.

This product dyes wool and nylon in yellow shades from a hot, neutral aqueous dyebath. When an aqueous solution of this dye is added to a neutral slurry of paper pulp at room temperature the paper is dyed a yellow shade.

The free acid prepared in this example and its salts are also useful as intermediates in the preparation of the basic yellow dyes which are disclosed in copending application Serial No. 39,756, for dyeing acid-modified acrylic and polyester fibers.

When 3'-hydroxyquinophthalone-5-carboxylic acid is dissolved in dilute aqueous $K_2CO_3$ at the boil, filtered hot, cooled and salted with KCl, the potassium salt of the acid is obtained. The ammonium salt is prepared in similar manner, when the free acid is dissolved in hot dilute ammonium hydroxide and subsequently salted out with ammonium chloride.

Example 2

A mixture of 21 parts of trimellitic acid, 20 parts of 3-hydroxy-2-methyl-4-quinolinecarboxylic acid and 200 parts of o-dichlorobenzene is heated at 170° C. for 7 hours. The mixture is cooled to 80° C. and 1000 parts of 0.5 M sodium carbonate are added. The slurry is heated to 90° C. and filtered hot. The o-dichlorobenzene layer is separated from the warm mixture. The water layer is heated to 100° C. and steam is passed in to distill out any remaining o-dichlorobenzene. Then 100 parts of sodium chloride are added to the aqueous mixture. After cooling the suspension to room temperature, the yellow precipitate is collected on a filter and washed with a little water. The dried product, which is the sodium salt of 3'-hydroxyquinophthalone-5-carboxylic acid, is essentially the same as that obtained in Example 1.

*Example 3*

A mixture of 2.1 parts of trimellitic acid, 3.6 parts of 6,8-dibromo-3-hydroxy-2-methyl-4-quinolinecarboxylic acid (obtained from 5,7-dibromoisatin and chloroacetone in the presence of calcium hydroxide in known manner) and 25 parts of o-dichlorobenzene is heated at 165° to 170° C. for 10 hours. After cooling to 10° C., the mixture is diluted with 40 parts of cold methanol. The yellow precipitate is collected on a filter, and washed with a little methanol. This dye, 6',8'-dibromo-3'-hydroxyquinophthalone-5-carboxylic acid, when dissolved in water containing some sodium carbonate, has good substantivity for paper pulp.

*Example 4*

A mixture of 27 parts 6,8-dichloro-3-hydroxy-2-methyl-4-quinolinecarboxylic acid (obtained in a known manner from 5,7-dichloroisatin and chloroacetone; see for instance French Patent No. 784,365), and 18 parts of trimellitic anhydride in 80 parts of o-dichlorobenzene is heated at 165° to 170° C. for 10 hours while removing water by distillation. The mixture is cooled to 15° C. and diluted with 100 parts of methanol. The yellow precipitate is collected on a filter and washed with methanol. The product, 6',8'-dichloro-3'-hydroxyquinophthalone-5-carboxylic acid, is dissolved in 500 parts of hot 0.5 M sodium carbonate and filtered hot. To the filtrate are added 300 parts of a 20% sodium chloride solution. The yellow product is collected on a funnel, washed with a little cold water, and then dried. A dark yellow powder is obtained which dyes wool and nylon in bright yellow shades.

*Example 5*

A slurry of 19 parts of 3-hydroxy-2-methyl-5,6-benzoquinoline-4-carboxylic acid (made from 4,5-benzoisatin and chloroacetone in known manner), 20 parts of trimellitic anhydride, and 100 parts of trichlorobenzene is stirred at 180° to 185° C. for 5 hours, while allowing water to distill out of the reaction mixture. After cooling to 10° C., the mixture is diluted with 100 parts of cold methanol. The yellow precipitate is collected on a funnel and washed with methanol. The resulting dye, 3'-hydroxy-5',6'-benzoquinophthalone-5-carboxylic acid has the following structure

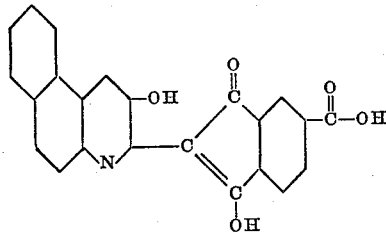

*Example 6*

A mixture of 20 parts of 7-chloro-3-hydroxy-2,8-dimethyl-4-quinolinecarboxylic acid (obtained from 6-chloro-7-methylisatin and chloroacetone in a known manner), 15 parts of trimellitic anhyride, and 60 parts of o-dichlorobenzene is heated at 165° to 170° C. for 10 hours. The mixture is cooled and diluted with 60 parts of cold methanol. The yellow precipitate of 7'-chloro-3'-hydroxy-8'-methylquinophthalone-5-carboxylic acid is collected on a filter.

When an equivalent amount of 6-chloro-3-hydroxy-2-methyl-4-quinolinecarboxylic acid or 3-hydroxy-2-methyl-6-phenyl-4-quinolinecarboxylic acid (French Patent No. 784,365) is substituted in this example in place of 7-chloro-3-hydroxy-2,8-dimethyl-4-quinolinecarboxylic acid, the corresponding yellow dyes are obtained which are soluble in hot, aqueous sodium carbonate solutions. These products dye nylon and wool in bright yellow shades. They also dye paper in yellow shades. The products are also useful intermediates for the preparation of basic dyes as disclosed in my copending application Serial No. 39,756, of even date herewith.

*Example 7*

To a slurry of 25 parts of 3'-hydroxyquinophthalone-5-carboxylic acid (from Example 1 above) in 100 parts of dry nitrobenzene are added 16.6 parts of thionyl chloride at 40° to 45° C. The mixture is heated to 90° to 95° C. slowly and agitated at this temperature for 2.5 hours. After cooling to 40° C. 100 parts of benzene are added. The mixture is cooled to 10° C., the 3'-hydroxyquinophthalone-5-carbonyl chloride is filtered off, washed with cold benzene and dried. The acid chloride is obtained in excellent yield. When an equivalent amount of thionyl bromide is substituted for thionyl chloride in this example, 3'-hydroxyquinophthalone-5-carbonyl bromide is obtained.

In a similar manner the quinophthalonecarboxylic acids obtained in Examples 3, 4, 5 and 6 above may be converted into the corresponding carbonyl chlorides or carbonyl bromides.

PART II.—PREPARATION OF THE ESTERS AND AMIDES

*Example 8*

To a solution of 3.5 parts of resorcinol in 10 parts of dry pyridine are added, at 5° C., 10 parts of 3'-hydroxyquinophthalone-5-carbonyl chloride (from Example 7). The mixture is allowed to warm to room temperature and is stirred at 25° C. for 20 hours. The mixture is drowned in 50 parts of water and the m-hydroxyphenyl ester of the quinophthalonecarboxylic acid is filtered off in excellent yield. This product dyes polyester fibers in bright yellow shades by the disperse dye procedure described in Example 12.

When an equivalent amount of phenol, o-cresol, p-chlorophenol or 1-naphthol is substituted for resorcinol in the above example, the corresponding disperse, yellow dyes for polyester and cellulose acetate fibers are obtained.

*Example 9*

To a solution of 10 parts of ethanol in 50 parts of dry pyridine at 0° C., are added 35 parts of 3'-hydroxyquinophthalone-5-carbonyl chloride. The mixture is slowly warmed to room temperature and maintained at that temperature overnight. The mixture is warmed at 50° to 60° C. for 1 hour, cooled and drowned into 150 parts of ice water. The precipitated product is collected on a filter and washed with water. The crude dye ester thus obtained is purified by slurrying it in 200 parts of water containing 10 parts of sodium carbonate at 10° C. for 10 minutes. The yellow product is collected on a filter and washed with cold water. It constitutes the ethyl ester of 3'-hydroxyquinophthalone-5-carboxylic acid, and dyes polyester fibers, by the disperse dye procedure given in Example 12, in bright yellow shades having excellent light-fastness.

When equivalent amounts of methanol, 2-(2-ethoxyethoxy)ethanol, octyl alcohol, 3-methoxy(or butoxy)-1-propanol, ethylene glycol, 2[2-(2-hydroxyethoxy)ethoxy]ethanol, or 2-(2-butoxyethoxy)ethanol, are substituted for ethanol in the above example, the corresponding esters are obtained, which likewise constitute yellow disperse dyes for polyester fibers.

*Example 10*

To a solution of 30 parts of 14% ammonium hydroxide and 30 parts of ethanol are added 10 parts of 3'-hydroxyquinophthalone-5-carbonyl chloride at room temperature. The mixture is warmed to 90° C. for 2 hours and then 100 parts of water are added. The mixture is acidified with acetic acid until the pH is decreased to 9. The 3'-hydroxyquinophthalone-5-carboxamide is collected on a filter and washed with water. This product dyes unmodified polyester fibers by the disperse dye procedure described in Example 12 and gives bright yellow shades having good light and sublimation fastness.

*Example 11*

To a mixture of 9 parts of aniline, 10 parts of sodium carbonate and 70 parts of ethanol are added 35 parts of 3'-hydroxyquinophthalone-5-carbonyl chloride at 10° to 20° C. The reaction mass is agitated at 70° to 80° C. for 1 hour, then treated with 100 parts of water and agitated at 80° C. for 2 hours. After cooling the mass to room temperature, the precipitate is filtered off and washed with water. The product, 3'-hydroxyquinophthalone-5-carboxanilide, affords bright yellow shades on unmodified polyester fibers by the disperse dye procedure described in Example 12.

When equivalent amounts of other amines are substituted for aniline in this example, the corresponding amides, which likewise are yellow disperse dyes for polyester fibers, are obtained. Operable amines for this purpose include the following: methylamine, isopropylamine, octylamine, diethylamine, dibutylamine, benzylamine, N-methylbenzylamine, N - ethylaniline, N - octylaniline, 2-aminoethanol, 2 - (ethylamino)ethanol, 2 - (butylamino)-ethanol, 1-butylamino-2-propanol, 2,2'-iminodiethanol, 2-anilinoethanol and 2-(benzylamino)ethanol.

PART III.—TYPICAL DISPERSE DYE PROCEDURE

*Example 12*

One part of the dye produced in Example 9 (for instance) is pasted in 2 parts of dimethylformamide and added to a dyebath consisting of 0.4 part of the sodium salt of a commercial long chain alkyl sulfate and 4000 parts of water. Then 100 parts of unmodified polyester fiber in staple form are introduced and the mixture is boiled for 0.5 hour. After adding 20 parts of benzanilide, the mixture is heated at the boil for 1.5 hours. The fabric is rinsed, scoured in 4000 parts of water containing 1 part of sodium carbonate and 2 parts of the sodium salt of the sulfate of the condensation product of ethylene oxide and oleyl alcohol for 30 minutes at 180° F., rinsed again, and dried. The fabric is then suspended for 2 minutes in air heated at 450° F. The fabric is rinsed again in water at 180° F. and then dried. A bright yellow dyeing having excellent wash, light and sublimation fastness properties is obtained.

When 100 parts of cellulose triacetate are employed in this example instead of the polyester fiber a bright yellow dyeing having excellent fastness properties is likewise obtained.

It will be understood that the details of the above examples may be varied widely within the skill of those engaged in this art.

I claim as my invention:
1. A compound of the formula

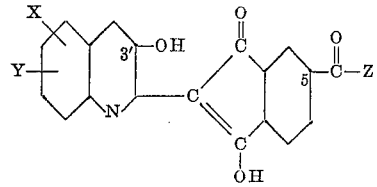

wherein X and Y represent members of the group consisting of H, Cl, Br, $CH_3$ and phenyl and when taken together form the benzo configuration

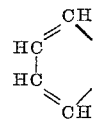

Z stands for a member of the group consisting of $O\text{—}C_nH_{2n+1}$, $n$ being an integer from 1 to 8, $OCH_2CH_2OH$, $OCH_2CH_2\text{—}OCH_2CH_2OH$,
$OCH_2CH_2\text{—}OCH_2CH_2\text{—}OCH_2CH_2OH$,
$OC_2H_4\text{—}O\text{—}alkyl$, $OC_3H_6\text{—}O\text{—}alkyl$,
$OC_2H_4\text{—}OC_2H_4\text{—}O\text{—}alkyl$, homocyclic O—aryl of 6 to 10 C-atoms in the cyclic structure, and

wherein A is a member of the group consisting of H, $C_nH_{2n+1}$, $n$ being an integer from 1 to 8, hydroxyalkyl, phenyl and benzyl while B is a member of the group consisting of hydrogen, alkyl and hydroxyalkyl, all the alkyl radicals hereinabove mentioned being alkyl radicals of 1 to 4 C-atoms.

2. Ethyl 3'-hydroxyquinophthalone-5-carboxylate.
3. 3'-hydroxyquinophthalone-5-carboxamide.
4. 3'-hydroxyquinophthalone-5-carboxanilide.

References Cited in the file of this patent
UNITED STATES PATENTS

| | | |
|---|---|---|
| 2,592,370 | Zwilgmeyer | Apr. 8, 1952 |
| 2,795,582 | Bauer et al. | June 11, 1957 |
| 2,818,409 | Zwilgmeyer | Dec. 31, 1957 |
| 2,828,311 | Gifford | Mar. 25, 1958 |

OTHER REFERENCES

Gilman et al.: J. American Chem. Soc., vol. 47, pages 245–9 (1925).